Patented July 15, 1952

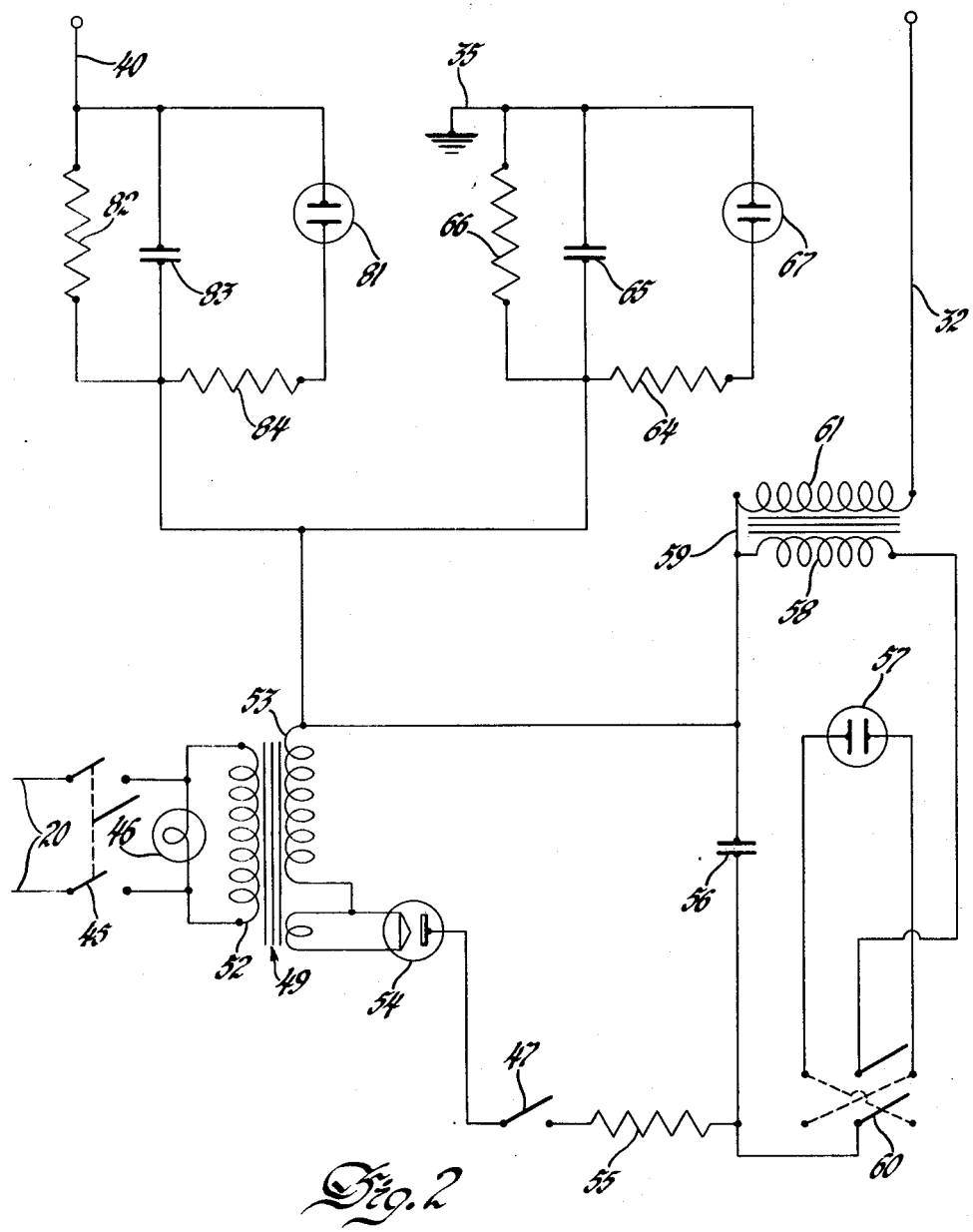

2,603,685

UNITED STATES PATENT OFFICE 2,603,685

SPARK PLUG TESTER

Wilfred A. Bychinsky, Ann Arbor, Mich., assignor to General Motors Corporation, Detroit, Mich., a corporation of Delaware Application May 28, 1948, Serial No. 29,773

15 Claims. (Cl. 175—183)

This invention relates to a method of and apparatus for testing the insulating properties of insulators, and more particularly the insulators of spark plugs.

An object of this invention is to provide a safe, easily and quickly operated apparatus for testing the insulators of spark plugs.

Another object is to provide a spark plug insulator testing apparatus that immediately indicates whether the spark plug insulator is satisfactory or unsatisfactory.

Another object is to provide a method of testing spark plug insulators which will immediately give an accurate indication of the condition of the insulator.

Other objects and advantages of the invention will be apparent in the following description.

The spark plug insulators are tested in accordance with this invention by insulating the electrodes at the gap, applying a high voltage electric current to the top terminal and determining whether the current will seek a path through the insulator or across the adjacent air gap. When the current seeks the path across the air gap it will indicate that the spark plug insulator has been subjected to a high overload and that the insulation is satisfactory, but when the current seeks the path through or over the spark plug insulator it will indicate that the insulator is defective. The insulator may be defective due to insufficient insulation capacity, so that the current passes through the insulator, or due to a coating or fouling which permits the current to pass around the insulator.

The testing apparatus employed to test spark plugs in this manner has a pressure chamber adapted to receive the spark gap end of the plug and contains an insulating fluid which is forced around the electrodes to insulate them from each other to a higher degree. One terminal of a source of high voltage current is then connected to the center electrode at the top terminal of the spark plug. An electrical collector is positioned slightly closer to the terminal than the nearest portion of the shell or shield, so that it will collect the discharge across the air gap from the terminal before it can jump the larger air gap to the spark plug shell or shield. This collector and the spark plug shell are both connected through separate indicators to the opposite side of the high voltage source. When the current jumps the air gap to the collector it actuates the indicator in the collector circuit and the plug is shown to be good, while if the current passes through the insulator to the shell, this actuates the indicator in the shell circuit and shows a defective plug.

In the drawing:

Figure 2 shows a modification of the electric circuit.

Figure 1:
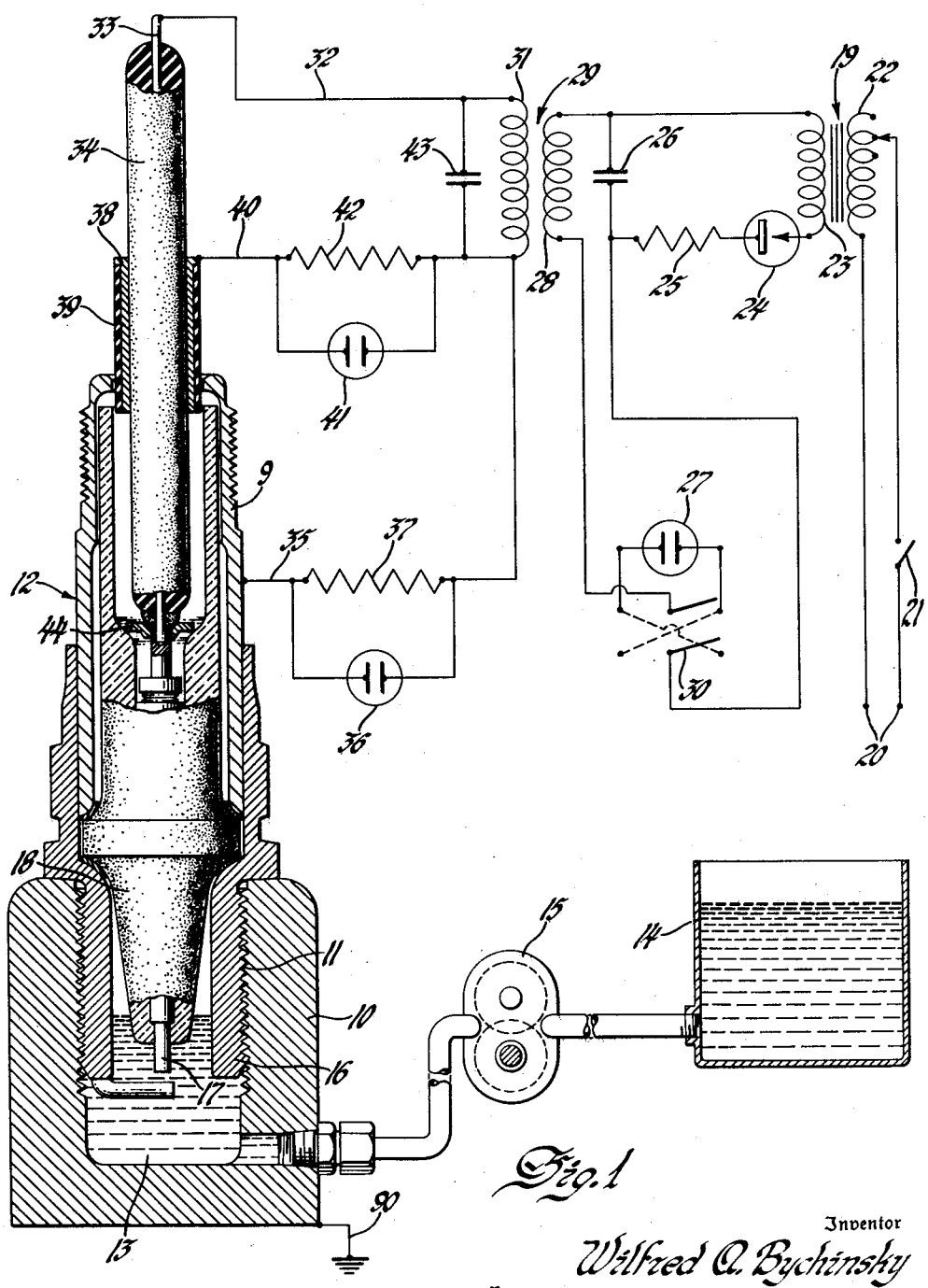
Figure 1 shows a diagrammatic view of the spark plug insulator testing apparatus and the electric circuit.

Referring specifically to the drawing, the testing apparatus includes a pressure chamber 10 with means to secure a spark plug in a wall of the chamber, such as the threaded aperture 11. A conventional shielded spark plug 12 is shown secured in the aperture 11 in the conventional manner in which plugs are secured in engines.

The cavity in the pressure chamber 10 is filled with an insulating fluid 13, such as transformer oil, which is supplied from a reservoir 14 by the pump 15. After the shielded spark plug 12 with shield 9 is secured in fluid-tight relation in the aperture 11, the pressure of the insulating fluid 13 is increased by the pump to force the fluid 13 up inside the shell 16 and around the electrodes 17 until it is approximately one-eighth inch above the tip of the insulator 18. In order to force the fluid in the cavity between the insulator and the shell sufficient pressure is required to compress the air trapped in the cavity above the fluid. In the conventional spark plug it has been found that a pressure of 17 pounds per square inch will force the insulating fluid about one-eighth inch above the bottom tip of the insulator, which is sufficient to completely insulate the electrode gap setting as low as .011 inch.

The electrical circuit for this testing apparatus is shown diagrammatically on the drawings. The circuit is energized by a power source 20 which is preferably 110-volt, 60-cycle alternating current. This current source is connected through a main switch 21 to the primary coil 22 of a small step-up transformer 19. The secondary coil 23 of this transformer, which may have about 630 volts, is connected to a current rectifier 24, such as a vacuum tube or dry type selenium rectifier, so that the current will flow in one direction only. The output from the rectifier 24 is connected in series to a resistance 25, which reduces the current flow in this circuit, and a condenser 26, and back to the other side of the secondary coil 23 of the transformer.

When the power is turned on as by the switch 21, a charge begins to build up in the condenser 26. Across the terminals of the condenser 26 a break-down tube 27 and the primary coil 28 of a high frequency step-up transformer 29 are connected in series. The break-down tube has a peak breakdown voltage somewhat less than the voltage of the secondary coil 23, such as 500 volts when used with the 630-volt secondary coil 23. A reversing switch 30 may be connected between the condenser and the break-down tube in order to change the tube polarity each time a plug is tested, and thereby greatly increase the life of the break-down tube 27 by reducing pitting of the tube electrodes.

The charge on condenser 26 will continue to build up until it reaches the peak voltage (500 volts) of the break-down tube 27. Then the voltage is great enough to cause a flash-over or discharge in the break-down tube. The discharge through the break-down tube 27 energizes the primary coil 28 of high frequency transformer 29 and induces a very high voltage impulse, such as 22,000 volts, in the secondary coil 31.

This high voltage impulse in the coil 31 is then applied by a suitably insulated conductor 32 and the lead-in connector 33 to the center electrode terminal 44 of the spark plug 12. The lead-in connector 33 and the insulator 34 are constructed similar to the lead-in conventionally used with the spark plug and may be inserted for test purposes, but is preferably made a part of the testing machine. If the spark plug insulator 18 has a crack or flaw or other defect therein, the current will choose the shortest path through the defect in the insulator to the shell 16 or shield 9 which are in electrical contact with each other. A conductor 35 connected to the shell has a suitable indicator, such as a neon tube or meter, etc., in the return circuit to the secondary coil 31. The indicator shown is a neon-glow tube 36 connected across the resistance 37, which is connected in series in the return conductor connecting the shell to the coil 31. The resistance 37 creates a voltage drop in the return line 35 so that the tube 36 will glow when current passes through this circuit. Since the current must pass through the insulator to operate glow tube 36, the glowing of this tube will indicate a defective spark plug.

If the spark plug 18 is not defective, the current cannot pass through the insulator and would ordinarily jump around the insulator 18 or the lead-in insulator 34 to the shield 9. In order to provide a reliable and different indication of a good spark plug, a collector ring 38, suitably insulated from the spark plug shell 16 by insulation, such as sleeve 39, is positioned around the lead-in insulator barrel 34 between the terminal 44 and the shield 9. When testing unshielded plugs that would not have a shield 9, the collector ring 38 would be positioned around insulator 18 and adjacent the top of the shell 16. The collector ring 38 is connected by a conductor 40 having an indicator, preferably consisting of a glow tube 41 connected across a resistance 42 to the coil 31. If the current jumps the air gap from terminal 44 to the collector ring 38 the glowing of tube 41 will indicate a good plug.

The two return circuits, one from the shell 16 to coil 31 and the other from collector ring 38 to coil 31, are similar alternative circuits. Thus the current applied to terminal 44, which will seek the path offering the least resistance, will jump the shortest gap through the spark plug insulator 18 and illuminate tube 36 if the spark plug insulator is defective, but will jump the longer gap from the terminal 44 to the collector ring 38 and illuminate tube 41 if the spark plug insulator is good. Thus the glow tubes 36 and 41 automatically and clearly indicate whether the plug is good or defective.

The pressure chamber 10 is grounded at 90 so that the operator will not receive electrical shocks when using the tester. A condenser 43 may be connected across the terminals of the secondary coil 31 in order to tune the transformer 29 for optimum output.

The modified circuit shown in Figure 2 may be employed with a spark plug tester which insulates the spark plug terminals at the air gap as shown in Figure 1. This circuit differs mainly in the use of an auto-transformer and an improved circuit to illuminate the neon glow tubes.

The circuit is energized by a power source 20 which is preferably 110 volts, 60-cycle alternating current. The power source is connected to the primary coil 52 of transformer 49. There may be included in these connections a main switch 45 and a pilot lamp 46. The secondary coil 53 of the transformer is connected in series with a rectifier tube 54 having a filament tap, a resistance 55 and a condenser 56. A switch 47 may also be included in this series circuit. Across the terminals of condenser 56 the primary coil 58 of auto-transformer or ignition coil 59 is connected in series with a break-down tube 57 which is connected into this series circuit by a reversing switch 60. The secondary coil 61 of ignition coil 59 has one lead connected to the primary coil 58 and the other lead connected to the conductor 32 which is attached to the lead-in conductor 33, and thence to the center electrode 44 of the spark plug as shown in Figure 1.

The conductor 35, which is grounded, if the spark plug is grounded, for connection to the spark plug shell or directly connected as shown in Figure 1, is connected in parallel through a condenser 65, a resistance 66 and the neon glow tube 67 to the side of the transformer coil 53, which is connected to the same terminal of condenser 56 that is connected to the interconnected terminal of auto-transformer 59. A resistance 64 is connected in series with the glow tube 67.

The conductor 40, which is connected to a collector ring 38 as shown in Figure 1, is connected through a parallel glow-tube circuit in the same manner as glow tube 67. This circuit includes in parallel the glow tube 81, resistance 82 and condenser 83 and resistance 84 is in series with the glow tube.

The operation of the test apparatus and electrical circuit is similar to the form of the invention shown in Figure 1. For the purposes of illustration, suitable electrical values will be specified. When the switch 45 is closed the 110-volt power source is stepped up to 630 volts by transformer 49. This current is rectified by a 2x2 rectifier tube and charges a 2 mfd. 600-volt D. C. condenser 56 through a 400-ohm, 10-watt resistor 55. The ignition coil steps up these current impulses to 22,000 volts.

In the same manner as in Figure 1, the high voltage current is connected to the spark plug terminal 44 by lead-in 33 and the conductor 32. If the spark plug insulator 18 is defective the current will flow through the insulator to the shell 16 to conductor 35 and illuminate glow tube 67. If the insulator is good the current will jump an air gap from terminal 44 to collector ring 38 and flow through conductor 40 to illuminate glow-tube 81.

The neon glow-tube 67 is connected across a 2000-ohm, 2-watt resistor 66 which provides a voltage drop to illuminate the glow-tube. A .01 mfd. 600-volt, D. C. condenser 65 in parallel with the glow-tube and a 500-ohm, 2-watt resistor 64 in series with the glow-tube are employed to bypass short spurious transient currents that would produce momentary breakdowns or flashes of the glow-tube. These currents would occur, for example, at the time the high voltage current is applied to the spark plug. The same circuit is employed with glow-tube 81.

Though certain specific embodiments of the invention have been shown for the purpose of illustration, the invention is capable of various modifications, within the scope of the claims, that will be readily apparent to a person skilled in the art.

I claim:

1. The method of testing a spark plug insulator which consists of the steps of insulating the spark plug terminals at the spark gap, imposing a high voltage current on the terminal of the center electrode of the spark plug, providing a standard comparative air gap shorter than the distance between the terminal and shell of the spark plug, visually determining whether the current path is through the air gap or through the spark plug shell.

2. The method of testing a spark plug insulator which consists of the steps of insulating the spark plug terminals at the spark gap, positioning an electric collector element in the direct air gap path between the spark plug terminal and the nearest portion of the spark plug shell, imposing a high voltage current on the spark plug terminal, and determining whether the current passes from the terminal to the collector to indicate a good plug or to the spark plug shell to indicate a defective plug.

3. A spark plug tester, means to insulate the spark plug electrodes at the gap, a source of high voltage current, means for connecting said source to the terminal of the spark plug, means providing a spark gap positioned in the air gap between said terminal and the spark plug shell, means responsive to passage of current through the spark plug insulator indicating current passage through the spark plug insulator to show a defective spark plug, and means responsive to current passage to the means providing a spark gap indicating current passage through the spark gap to show a good spark plug.

4. The invention defined by claim 3, one of said indicating means consisting of a resistance with a glow tube connected across said resistance.

5. The invention defined by claim 3, said spark gap means comprising a collector ring surrounding the spark plug insulator between the spark plug terminal and shell.

6. A spark plug tester, means to insulate the spark plug electrodes at the gap, a source of high voltage current, means for connecting said source to the spark plug terminal, a collector ring adjacent the terminal and spaced therefrom by a spark gap shorter than the air gap to the spark plug shell, a first return conductor connecting said collector ring to said source, a second return conductor connecting the spark plug shell to said source, and indicating means in said conductors indicating whether the current passed through said first or second conductor.

7. The invention defined by claim 6, one of said indicating means comprising a resistance in said conductor, and a glow tube connected across said resistance.

8. The invention defined by claim 6, said collector ring being positioned concentric with the spark plug insulator between the terminal and the shell.

9. The invention defined by claim 6, said source comprising a first transformer having primary and secondary coils, a rectifier, a resistance and a condenser connected in series with the secondary coil of said first transformer, a second transformer having primary and secondary coils, and the primary coil of said second transformer and a voltage break-down tube connected in series across said condenser.

10. The invention defined by claim 9, one of said indicating means comprising a resistance in said conductor and a glow tube connected across said resistance.

11. In a spark plug tester, a pressure chamber, an aperture in said chamber for the reception of the electrode end of a spark plug, means to seal the spark plug in said aperture in fluid-tight relation, an insulating fluid in said chamber, means to position said fluid around the spark plug electrodes, a source of high voltage current, connector means for connecting said source to the spark plug terminal, a collector positioned adjacent said terminal and spaced therefrom by a spark gap shorter than the air gap to the spark plug shell, a first return conductor connecting said collector to said source, a second return conductor connecting the spark plug shell to said source, and indicating means in each of said return conductors.

12. A spark plug tester, means to insulate the spark plug electrodes at the gap, a source of high voltage current, means for connecting said source to the spark plug terminal, a collector member adjacent the terminal and spaced therefrom by a spark gap shorter than the air gap to the spark plug shell, a first return conductor connecting said collector member to said source, a second return conductor connecting the spark plug shell to said source, and indicating means in said conductors indicating whether the current passed through said first or second conductor.

13. In a spark plug testing machine, a transformer having a primary coil connected to a current source and a secondary coil, a rectifier and a condenser connected in series with said secondary coil, an auto transformer and a break-down tube connected in series across the terminals of said condenser, a reversing switch connecting said break-down tube with the transformer and the condenser, one output terminal of an auto transformer having a conductor for connection to a spark plug, a connector for connection to a collector ring, a second connector for connection to the spark plug shell, said connectors being connected to the other output terminal of an auto transformer, and indicator means in said connectors.

14. The invention defined by claim 13, said indicator means including a resistance in said connector, a neon tube connected across said resistance.

15. The invention defined by claim 14, a condenser connected in parallel with said resistor.

WILFRED A. BYCHINSKY.

REFERENCES CITED

The following references are of record in the file of this patent:

UNITED STATES PATENTS

| Number | Name | Date |
| --- | --- | --- |
| 1,950,484 | Clarvoe | Mar. 13, 1934 |
| 2,091,813 | Hays | Aug. 31, 1937 |
| 2,157,160 | Buck | May 9, 1939 |
| 2,175,038 | Soper | Oct. 3, 1939 |
| 2,343,300 | Klumb | Mar. 7, 1944 |
| 2,478,414 | Michal | Aug. 9, 1949 |